(12) United States Patent
Sahin et al.

(10) Patent No.: US 7,302,833 B2
(45) Date of Patent: Dec. 4, 2007

(54) TORSIONAL HARMONIC CANTILEVERS FOR DETECTION OF HIGH FREQUENCY FORCE COMPONENTS IN ATOMIC FORCE MICROSCOPY

(75) Inventors: Ozgur Sahin, Stanford, CA (US); Calvin F. Quate, Menlo Park, CA (US); Olav Solgaard, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 11/456,810

(22) Filed: Jul. 11, 2006

(65) Prior Publication Data

US 2006/0236757 A1    Oct. 26, 2006

Related U.S. Application Data

(62) Division of application No. 10/887,608, filed on Jul. 8, 2004, now Pat. No. 7,089,787.

(51) Int. Cl.
*G01B 5/28*   (2006.01)
*G01N 13/10*  (2006.01)
*G12B 21/08*  (2006.01)
*G12B 21/22*  (2006.01)

(52) U.S. Cl. .......................................... 73/105
(58) Field of Classification Search ................. 73/105
See application file for complete search history.

(56) References Cited

U.S. PATENT DOCUMENTS 5,412,980 A    5/1995   Elings et al.

(Continued)

FOREIGN PATENT DOCUMENTS

WO    00/46569    8/2000

(Continued)

OTHER PUBLICATIONS

Kawagishi, T. et al., "Mapping of Lateral Vibration of the Tip in Atomic Force Microscopy at the Torsional Resonance of the Cantilever," Ultramicroscopy, vol. 91, 2000, pp. 37-48.*

(Continued)

*Primary Examiner*—Daniel S. Larkin
(74) *Attorney, Agent, or Firm*—Patent Law Group LLP; Carmen C. Cook

(57) ABSTRACT

A method for measuring high frequency force of interaction between a tip of a cantilever and a sample includes providing a cantilever having a cantilever arm and a probe tip formed on a free end of the cantilever arm where the cantilever arm has a first shape and an axis of torsion associated with the first shape and the probe tip is positioned in an offset displacement from the axis of torsion, vibrating the cantilever at or near the fundamental flexural resonance frequency with a predetermined oscillation amplitude, bringing the cantilever to the vicinity of the sample, tapping the surface of the sample repeatedly using the probe tip, and detecting changes in the amplitude or the phase of a high frequency vibration harmonic of the cantilever as the cantilever is deflected in response to features on the surface of the sample.

19 Claims, 6 Drawing Sheets

U.S. PATENT DOCUMENTS

| | | | |
|---|---|---|---|
| 5,444,244 | A | 8/1995 | Kirk et al. |
| 5,483,822 | A | 1/1996 | Albrecht et al. |
| 5,519,212 | A | 5/1996 | Elings et al. |
| 5,646,339 | A | 7/1997 | Bayer et al. |
| 5,742,377 | A | 4/1998 | Minne et al. |
| 5,866,805 | A | 2/1999 | Han et al. |
| 5,877,412 | A | 3/1999 | Muramatsu et al. |
| 5,883,705 | A | 3/1999 | Minne et al. |
| RE36,488 | E | 1/2000 | Elings et al. |
| 6,075,585 | A | 6/2000 | Minne et al. |
| 6,079,255 | A | 6/2000 | Binning et al. |
| 6,298,715 | B1 | 10/2001 | Thomson et al. |
| 6,349,591 | B1 | 2/2002 | Fretigny et al. |
| 6,452,170 | B1 | 9/2002 | Zypman et al. |
| 6,465,782 | B1 | 10/2002 | Kendall |
| 6,578,410 | B1 | 6/2003 | Israelachvili |
| 6,767,696 | B2 | 7/2004 | Howald et al. |
| 6,935,167 | B1 | 8/2005 | Sahin et al. |
| 6,945,099 | B1 * | 9/2005 | Su et al. ..................... 73/105 |

FOREIGN PATENT DOCUMENTS

| | | |
|---|---|---|
| WO | 2004/005845 A2 | 1/2004 |

OTHER PUBLICATIONS

Sahin et al., "Harmonic Cantilevers for Nanomechanical Sensing of Elastic Properties", Transducers '03, The 12th International Conference on Solid State Sensors, Actuators and Microsystems, Boston, Jun. 8-12, 2003, pp. 1124-1127.

Sahin et al., "Simulation of Higher Harmoncis Generation in Tapping-Mode Atomic Force Microscopy", Applied Physics Letters, vol. 79, No. 26, Dec. 24, 2001, pp. 4455-4457.

Stark et al., "Tapping-Mode Atomic Force Microscopy and Phase-Imaging in Higher Eigenmodes", Applied Physics Letters, vol. 74, No. 22, May 31, 1999, pp. 3296-3298.

Hillenbrand et al., "Higher-Harmonics Generation in Tapping-Mode Atomic-Force Microscopy: Insights into the Tip-Sample Interaction", Applied Physics Letters, vol. 26, No. 23, Jun. 5, 2000, pp. 3478-3480.

Rabe et al., "Imaging and Measurement of Local Mechanical Material Properties by Atomic Force Acoustic Microscopy", Surface and Interface Analysis, 2002, vol. 33, pp. 65-70.

Stark et al., "Inverting Dynamic Force Microscopy: From Signals to Time-Resolved Interaction Forces", PNAS, Jun. 25, 2002, vol. 99, No. 13, pp. 8473-8478.

Stark et al., "Higher Harmonics Imaging in Tapping-Mode Atomic-Force Microscopy, Review of Scientific Instruments," Dec. 2003, pp. 5111-5114, vol. 74, No. 12, pp. 5111-5114.

International Search Report, 12 pages.

* cited by examiner

TORSIONAL HARMONIC CANTILEVERS FOR DETECTION OF HIGH FREQUENCY FORCE COMPONENTS IN ATOMIC FORCE MICROSCOPY

CROSS REFERENCE TO RELATED APPLICATION

This application is a divisional of application Ser. No. 10/887,608, filed Jul. 8, 2004, now U.S. Pat. No. 7,089,787, issued Aug. 15, 2006, entitled "Torsional Harmonic Cantilevers For Detection Of High Frequency Force Components In Atomic Force Microscopy" of the same inventors hereof, which application is incorporated herein by reference in its entirety.

FIELD OF THE INVENTION

The invention relates to cantilevers and imaging methods using the cantilevers and, in particular, to cantilevers for detecting high frequency force components and imaging methods using the same.

DESCRIPTION OF THE RELATED ART

Scanning Probe Microscopy (SPM) refers to the class of instruments and imaging methods where a probe, typically of very small dimensions, is scanned relative to a sample surface for providing a microscopic analysis of the topographical features or material properties of the sample surface. A variety of SPM is Atomic Force Microscopy (AFM), also referred to as Scanning Force Microscopy (SFM), where a flexible cantilever with a tip is used to scan the sample surface.

An atomic force microscope (AFM) has proven to be an exceptionally useful tool for mapping the topography of surfaces at the nanoscale. In an AFM, a flexible cantilever with an atomically sharp tip is brought to the vicinity of a sample surface and the deflections of the cantilever as a result of the attractive and repulsive forces between the tip and the sample are monitored while the cantilever is scanned across the surface. The cantilever can be in a contacting mode of operation where the tip is in constant contact with the sample surface. When continuous contact between the tip and the sample is used, frictional forces between the tip and the sample often result in damages to both the tip and the sample. Dynamic imaging techniques that do not require continuous tip-sample contact have also been introduced. In dynamic imaging modes, the tip is maintained at a short distance from the surface of the sample and makes intermittent contact with the sample surface. Among the various dynamic imaging techniques, tapping-mode atomic force microscopy (TM-AFM) has become the most widely used. In TM-AFM, the tip is vibrated at one of its resonance frequency in vicinity of the sample surface. Dynamic atomic force microscopy methods (such as TM-AFM) largely eliminate tip and sample damage and are therefore widely used in atomic force microscopy imaging.

In atomic force microscopy, the force interaction between the tip and sample surface depends on the material properties of the tip and the sample. Measurement of the tip-sample forces enables study of material properties and mapping of chemical composition variations across the sample surface. When the cantilever vibrates in the vicinity of a sample, tip-sample forces will have higher harmonic components that generate high frequency vibrations in the cantilever. These high frequency force components carry information about the tip-sample interaction. Imaging with these higher harmonics has been demonstrated and the result has shown good contrast based on material properties. Unfortunately, the vibration amplitudes of traditional AFM cantilevers at higher harmonics are too small for practical AFM imaging. Specifically, the signals at higher harmonics are 20-30 dB lower than the signal at the driving frequency of the cantilever. Thus, the resolution of imaging using the higher harmonics signals is severely limited.

Therefore, it is desirable to provide an apparatus or image method which can enable non-destructive measurement of the high frequency tip-sample force components as result of the vibration of a cantilever near a sample surface.

SUMMARY OF THE INVENTION

According to one embodiment of the present invention, a cantilever for the use in atomic force microscopy includes a cantilever arm having a fixed end being attached to a base member and a free end where the cantilever arm has a first shape and an axis of torsion associated with the first shape, and a probe tip projecting from the cantilever arm near the free end where the probe tip is positioned in an offset displacement from the axis of torsion. In one embodiment, the probe tip is positioned at least about 2 μm from the axis of torsion. In another embodiment, the probe tip is positioned away from the axis of torsion and near an outside edge of the cantilever arm.

In one embodiment, the cantilever arm has a first shape selected to tune a resonance frequency of a selected torsional mode or the fundamental flexural resonance frequency so that the torsional resonance frequency and the fundamental flexural resonance frequency has an integer ratio. In this manner, the torsional motion of the torsional harmonic cantilever at that harmonic frequency will be largely enhanced by the corresponding torsional resonance.

According to another aspect of the present invention, a method for measuring high frequency force of interaction between a tip of a cantilever and a sample includes providing a cantilever having a cantilever arm and a probe tip formed on a free end of the cantilever arm where the cantilever arm has a first shape and an axis of torsion associated with the first shape and the probe tip is positioned in an offset displacement from the axis of torsion, vibrating the cantilever at or near the fundamental flexural resonance frequency with a predetermined oscillation amplitude, bringing the cantilever to the vicinity of the sample, tapping the surface of the sample repeatedly using the probe tip, and detecting changes in the amplitude or the phase of a high frequency vibration harmonic of the cantilever as the cantilever is deflected in response to features on the surface of the sample.

According to another aspect of the present invention, a method for measuring high frequency force of interaction between a tip of a cantilever and a sample includes providing a cantilever having a cantilever arm and a probe tip formed on a free end of the cantilever arm where the cantilever arm has a first shape and an axis of torsion associated with the first shape and the probe tip is positioned in an offset displacement from the axis of torsion, vibrating the cantilever at or near the fundamental flexural resonance frequency with a predetermined oscillation amplitude, bringing the cantilever to the vicinity of the sample, tapping the surface of the sample repeatedly using the probe tip, measuring torsional vibration harmonics of the cantilever motion as the cantilever is deflected in response to features on the surface of the sample, and reconstructing the time-resolved waveform of the tip sample forces using the measured torsional vibration harmonics.

The present invention is better understood upon consideration of the detailed description below and the accompanying drawings.

DETAILED DESCRIPTION OF THE PREFERRED EMBODIMENTS

Figure 2A:
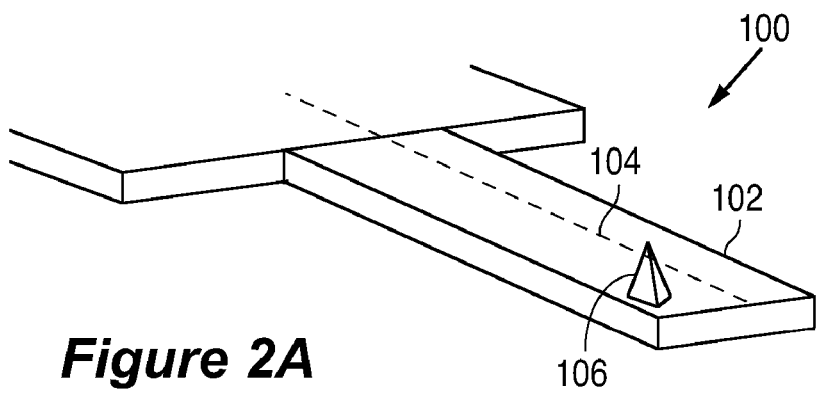
FIG. 2A is a perspective view of a cantilever according to one embodiment of the present invention.
Figure 2B:
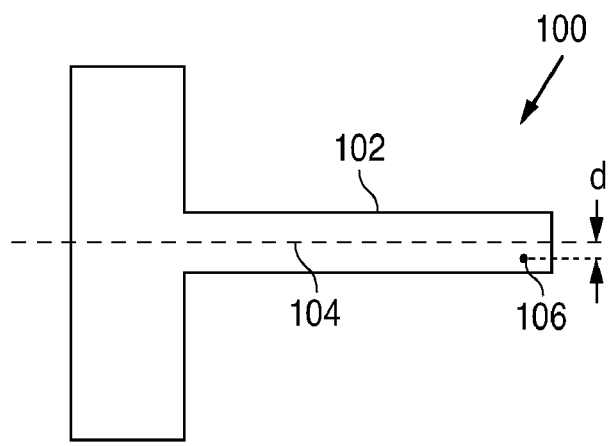
FIG. 2B is a top view of the cantilever of FIG. 2A.

In accordance with the principles of the present invention, a cantilever including a tip at the free end of the cantilever is configured to incorporate a geometric feature that amplifies signals associated with high frequency components of the tip-sample interaction force when the cantilever is vibrated near the surface of a sample. When the cantilever is applied in a scanning probe microscope, the cantilever forms a high bandwidth and highly sensitive mechanical system that enables the detection and measurement of signals associated with the high frequency force components of the non-linear tip-sample interaction. In one embodiment, the cantilever includes a cantilever arm and a tip at the free end of the cantilever arm that is positioned at an offset location from the axis of torsion of the cantilever arm. More specifically, the tip is offset laterally from a longitudinal axis of torsion of the cantilever arm as shown in FIGS. 2A and 2B. Placing the tip at the offset location from the axis of torsion enhances the torsional motions of the cantilever. As a result, signals related to a significant number of the high frequency force components of the tip-sample interaction force can be amplified to allow new imaging modalities or study of the material properties of the sample under test.

One useful application of the cantilever of the present invention is in a tapping-mode AFM where the cantilever can be used to study material properties of the sample. However, the cantilever of the present invention can be applied in many other applications, both within scanning probe microscopy or beyond. In sum, the cantilever of the present invention can be applied when the high frequency tip-sample interaction force components are of interest.

Figure 1:
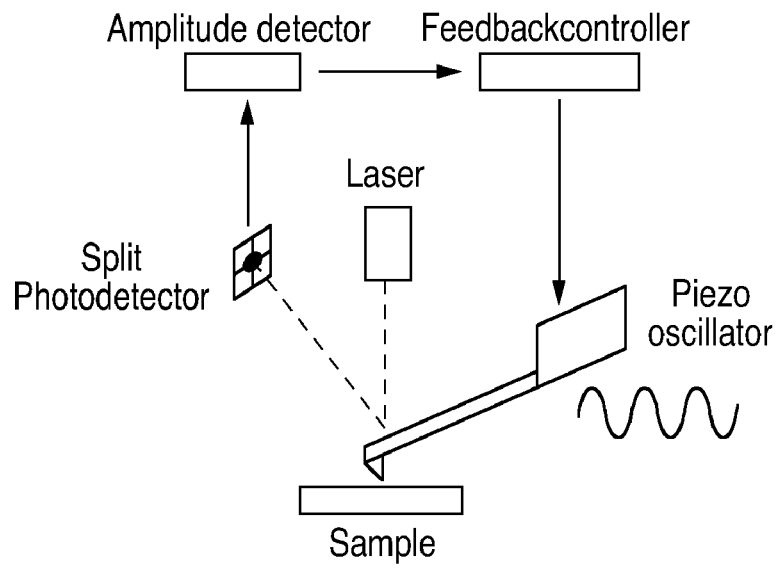
FIG. 1 is a generalized schematic diagram of a tapping-mode atomic force microscope.

FIG. 1 is a generalized schematic diagram of a tapping-mode atomic force microscope. In the TM-AFM of FIG. 1, the cantilever is vibrated at a frequency close to one of its flexural resonances, typically the fundamental resonance frequency, in the vicinity of the sample surface so that the tip makes intermittent contacts (tapping) with the surface once in every oscillation period. During the scan across the surface, the amplitude of vibration is maintained at a constant value through a feedback loop that adjusts the height of the cantilever base. Specifically, a light beam and a photodetector are used to measure the motion of the cantilever at the driving frequency. The feedback signal therefore reflects the topography of the surface. In FIG. 1, the feedback loop includes an optical lever detection system and a feedback controller.

The cantilever of the present invention incorporates a geometric feature to realize amplification of high frequency force components of the interaction between a sample and the tip of the cantilever. The geometric feature can be implemented in various forms to accomplish the signal amplification. According to one embodiment of the present invention, a cantilever includes a tip at the free end that is positioned at an offset location from the axis of torsion of the cantilever arm. The offset tip placement enhances the torsional motion of the cantilever. Specifically, when the offset tip hits the sample surface, the interaction forces excite the torsional modes of the cantilever. In the present description, a cantilever with an offset tip placement for enhancing torsional motion will be referred to as a "torsional cantilever." However, it is important to note that a "torsional cantilever" of the present invention may, when driven at a given frequency, vibrate in a flexural mode, a torsional mode or other vibrational modes. The use of the term "torsional" is not intended to limit the vibrational modes of the cantilever of the present invention to torsional motion only.

Furthermore, in the present description, the term "axis of torsion" refers to an axis of the cantilever where the cantilever is not displaced by torsional vibration when the cantilever is vibrated. That is, the axis of torsion is where the cantilever does not move in the torsional mode. More specifically, the axis of torsion generally extends in the longitudinal direction of the cantilever arm. For a symmetrical cantilever, such as a rectangular cantilever, the axis of torsion is the center line of the cantilever arm perpendicular to the base of the cantilever. However, for cantilevers in other geometries, the axis of torsion is not necessarily the center line of the cantilever arm and moreover, is not necessarily a straight line. The axis of torsion for a cantilever of any given geometry can be determined, such as by use of a simulation software. In conventional cantilevers, the probe tip is always positioned on the axis of torsion of the cantilever arm.

FIG. 2A is a perspective view of a cantilever according to one embodiment of the present invention. FIG. 2B is a top view of the cantilever of FIG. 2A. Referring to FIGS. 2A and 2B, a torsional cantilever 100 is a rectangular cantilever and includes a cantilever arm 102 projecting from a base. A probe tip 106 is positioned near the free end of cantilever arm 102. For torsional cantilever 100, the axis of torsion is the center line of cantilever arm 102 along the longitudinal axis of the cantilever arm, indicated by a dash-dot line 104 in FIGS. 2A and 2B. Probe tip 106 is an offset position relative to the axis of torsion (line 104). That is, probe tip 106 is offset laterally from the longitudinal axis of torsion of the cantilever arm. Specifically, in the present embodiment, probe tip 106 is positioned a distance "d" from the axis of torsion. By placing probe tip 106 away from the axis of torsion, the probe tip will be displaced when the cantilever is vibrated in the torsional mode. The torsional motion of the cantilever is then enhanced, resulting in the amplification of high frequency harmonics of the tip-sample interaction force.

The amount of offset displacement or the distance "d" can vary from a minimal displacement (near the axis of torsion) to maximum displacement (near the edge of the cantilever arm). The exact amount of offset is selected based on design choice. In most cases, a minimal displacement of more than the normal process variations or alignment errors should be used to ensure that the probe tip is displaced from the axis of torsion. For example, in one embodiment, the probe tip should be at least about 2 μm from the axis of torsion. It is generally understood that the farther away the probe tip is displaced from the axis of torsion, the more torsional motion the probe tip will experience. Thus, the probe tip can be placed near the axis of torsion for minimum torsional motion and placed near the edge of the cantilever arm to obtain maximum torsional motion.

Figure 3:
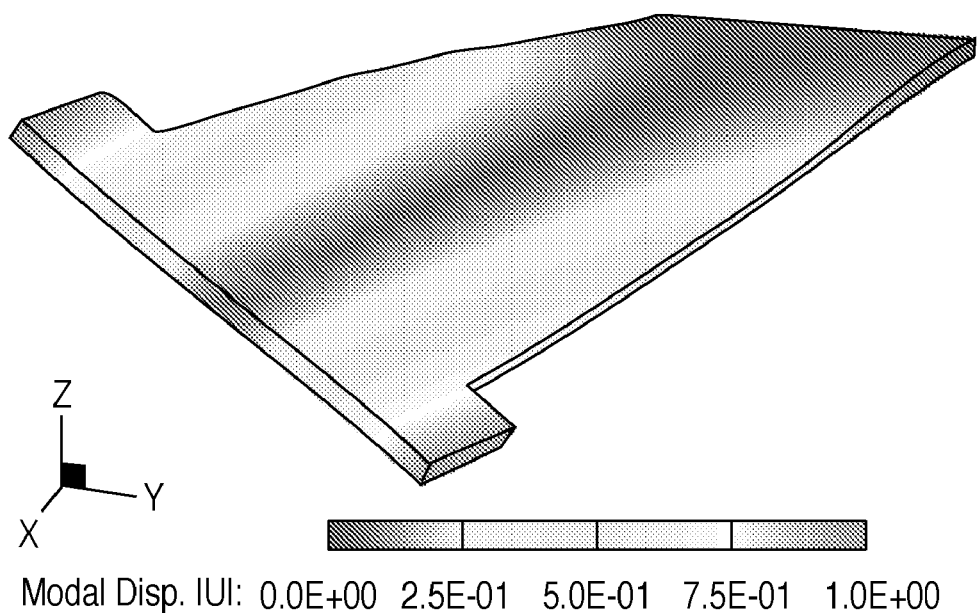
FIG. 3 illustrates the mode shape of the torsional mode of the cantilever of FIGS. 2A and 2B.

FIG. 3 illustrates the mode shape of the torsional mode of cantilever 100. As can be seen from FIG. 3, locations on the cantilever that are away from the torsion axis (center line in this case) exhibit larger displacement. If the tip offset distance is larger, tip-sample forces will create a larger torque and hence result in a larger torsion angle and better excitation of torsional modes. This is advantageous in terms of signal improvement, however, the effect of torsional modes on the overall cantilever dynamics will be more significant.

Figure 4:
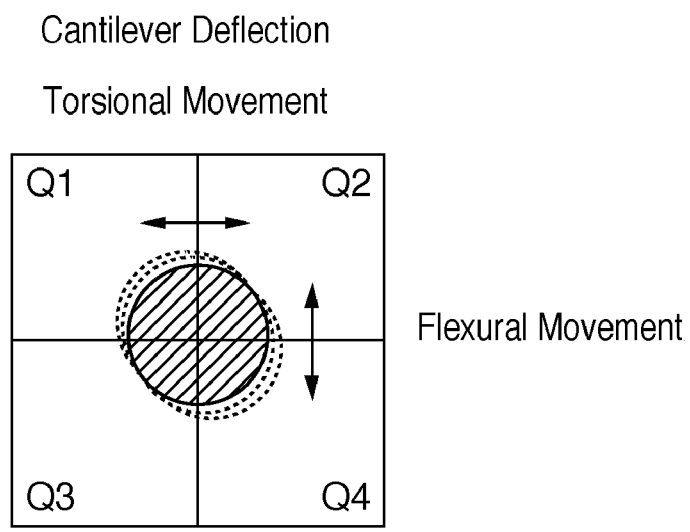
FIG. 4 illustrates a split photodetector and a deflection measurement technique using the photodetector for detecting flexural and torsional movements.

When cantilever 100 of the present invention is applied in a scanning force microscope, such as the tapping-mode AFM of FIG. 1, the same deflection measurement technique can be used to detect the flexural movement as well as the torsional movement of the cantilever. FIG. 4 illustrates a split photodetector and a deflection measurement technique using the photodetector for detecting flexural and torsional movements. The split photodetector used in a SFM is usually divided into four quadrants Q1 to Q4. The light spot resulted from the reflection of the laser light beam off the cantilever arm is shown as a circular spot about the center of the photodetector quadrants. The movement of the tip of the cantilever is detected by summing and subtracting of the light signals detected in each of the quadrants. In the illustration in FIG. 4, it is assumed that the flexural motion of the cantilever tip results in an up-down motion of the light spot and the torsional motion results in a left-right motion of the light spot. To measure the flexural deflection of the cantilever tip, the signals in quadrants Q1 and Q2 are summed and the signals in quadrants Q3 and Q4 are summed. The difference of the two summed signals is then used to indicate flexural motion. To measure the torsional deflection of the cantilever, the signals in quadrants Q1 and Q3 are summed and the signals in quadrants Q2 and Q4 are summed. The difference of the two summed signals is then used to indicate torsional motion. In case of a misaligned photodiode and cantilever the cross talk between the flexural and torsional signals has to be taken into account.

One advantage of the torsional cantilever of the present invention when applied in a scanning force microscope in an increase in imaging speed. When the torsional deflections are used in the feedback loop of the scanning force microscope, the torsional harmonics, being at higher frequencies, provide a faster response time for the imaging signals. Furthermore, the high frequency torsional harmonic signals can be advantageously applied to enable rapid detection of tip-sample engagement and disengagement.

In a conventional cantilever, the torsional vibration or torsional modes have higher resonant frequencies than the fundamental flexural modes. However, the torsional modes of the cantilever are not excited in a conventional cantilever. In accordance with the present invention, the torsional cantilever can be used to excite the torsional mode to enable detection of high frequency force components. When the torsional cantilever of the present invention is applied in a dynamic AFM operation, the torsional cantilever is oscillating in a flexural mode while the tip-sample interaction forces will excite torsional modes of the cantilever. The torsional modes are excited because the tip of the torsional cantilever is located offset from the axis of torsion. The offset placement of the probe tip allows tip-sample forces to generate torsion on the cantilever. Because the torsion arm (the width of the cantilever arm) is shorter than the length of the cantilever, a small tip displacement in the torsional mode will result in a relatively large angular deflection. Therefore, a laser beam reflected from the back of the cantilever can easily detect the torsional motion of the cantilever. Because the torsional modes of the cantilever have high bandwidth, high frequency harmonics of the tip-sample forces will efficiently generate torsional vibrations.

Figure 5:
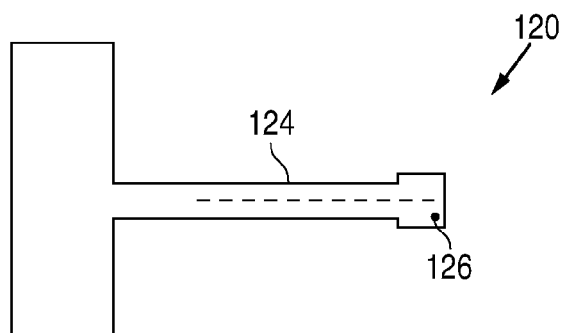
FIG. 5 is a top view of a cantilever according to a first alternate embodiment of the present invention.

The torsional cantilever of the present invention can be configured in many shapes and geometry depending on the desired application. The salient feature of the torsional cantilever of the present invention is the offset placement of the probe tip from the axis of torsion. The probe tip can be displaced on either side of the axis of torsion. FIG. 5 is a top view of a cantilever according to a first alternate embodiment of the present invention. Referring to FIG. 5, a torsional cantilever 120 is configured as a rectangular cantilever with an enlarged free end. A probe tip 126 is positioned at an offset displacement from the axis of torsion 124 of the cantilever arm. In one implementation, cantilever 120 is able to realize a first torsional resonance frequency that is 16.3 times the fundamental flexural resonance frequency. The wider free end of cantilever 120 has the effect of tuning the torsional resonance frequency of the cantilever as will be described in more detail below.

Figure 6:
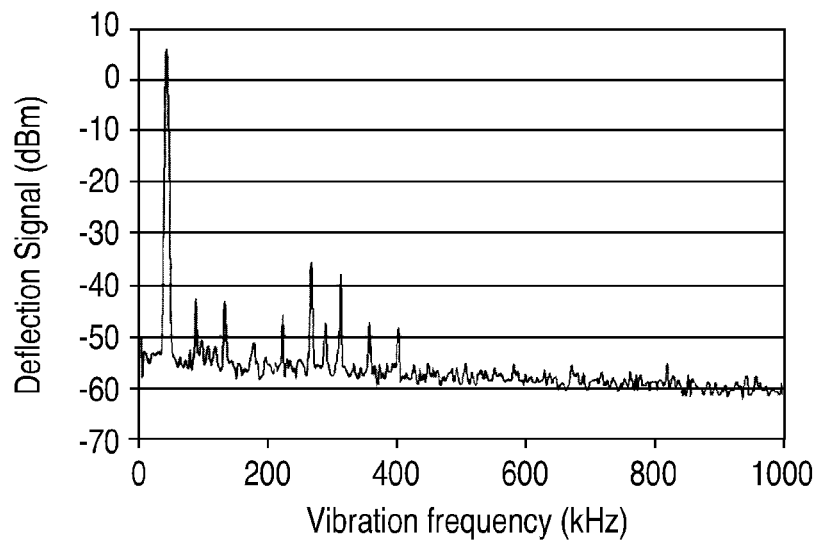
FIG. 6 is the flexural vibration spectrum of the cantilever of FIG. 5 while the cantilever is being tapped on a sample surface at the fundamental resonance frequency.
Figure 7:
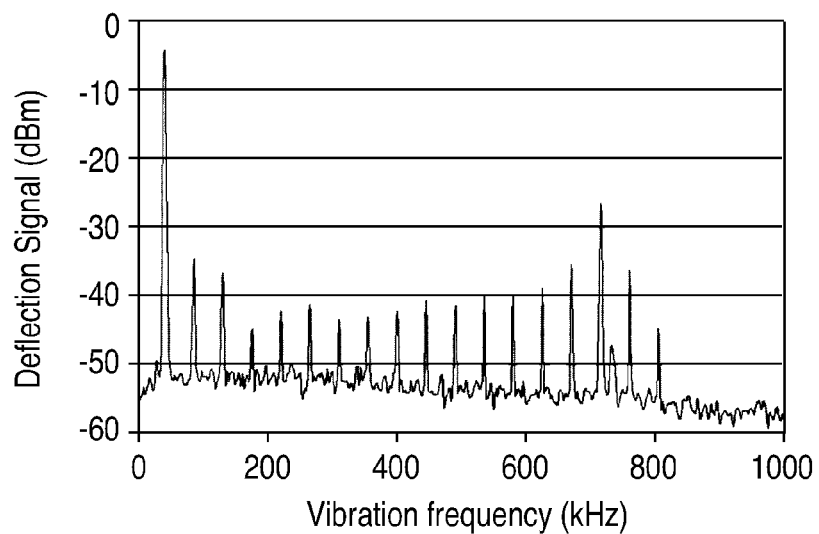
FIG. 7 is the torsional vibration spectrum of the cantilever of FIG. 5 while the cantilever is being tapped on a sample surface at the fundamental resonance frequency.

FIGS. 6 and 7 are spectrums of the flexural and torsional vibrations, respectively, of cantilever 120 tapping on a sample surface at the fundamental flexural resonance frequency. From a comparison of the vibration spectrum of the flexural mode (FIG. 6) and the vibration spectrum of the torsional mode (FIG. 7), it can be observed that more high harmonic force components are excited in the torsional mode with better signal to noise ratio. Thus, more information regarding the tip-sample interaction can be retrieved from the torsional vibration spectrum.

Figure 8:
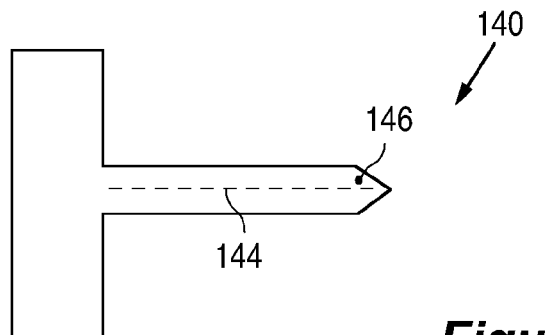
FIG. 8 is a top view of a cantilever according to a second alternate embodiment of the present invention.
Figure 9:
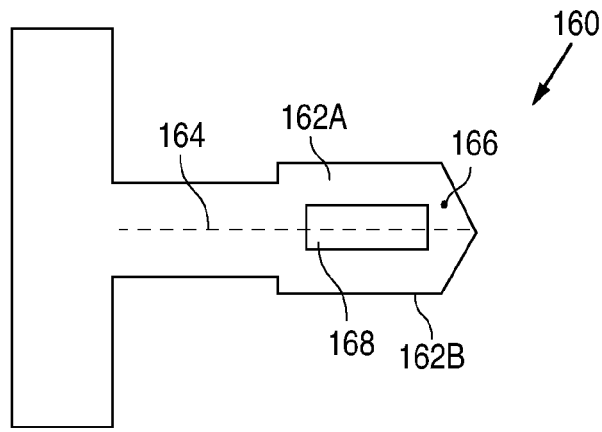
FIG. 9 is a top view of a cantilever according to a third alternate embodiment of the present invention.
Figure 10:
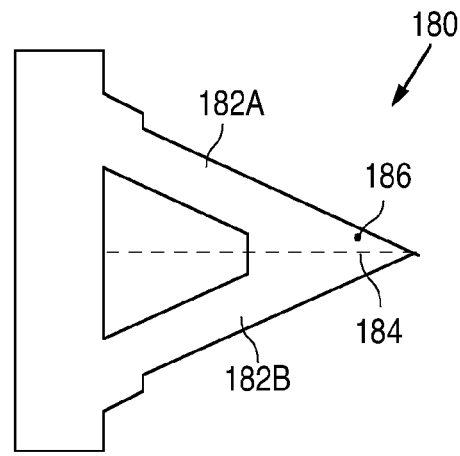
FIG. 10 is a top view of a cantilever according to a fourth alternate embodiment of the present invention.

FIGS. 8-10 illustrate three other alternate embodiments of the torsional cantilever of the present invention. One of ordinary skill in the art, upon being apprised of the present description, would appreciate that the torsional cantilever of the present invention can be implemented using various cantilever configurations and geometries. Referring to FIG. 8, a torsional cantilever 140 is formed as a rectangular cantilever with a tapered free end. A probe tip 146 is positioned offset from the axis of torsion (line 144). Referring to FIG. 9, a torsional cantilever 160 is configured as a rectangular cantilever including two arms 162A and 162B separated by an opening 168. The free end of cantilever 160 is also tapered. A probe tip 166 is positioned at an offset location from the axis of torsion (line 164). Finally, referring to FIG. 10, a torsional cantilever 180 is formed as a triangular cantilever including arms 182A and 182B. A probe tip 186 is positioned at an offset location from the axis of torsion (line 184).

The torsional cantilever of the present invention has many applications in imaging and in material analysis. In one application, the torsional harmonics (both phase and amplitude) of the torsional cantilever are measured for generating images of the sample surface. In another application, the torsional cantilever is applied to generate a large number of vibration harmonics. When most or all of the harmonic force components are measured, the harmonic force components can be added in the time domain to reconstruct the time-resolved waveform of the tip-sample forces. It is well understood that when all the harmonic force components are added together a force diagram of the tip-sample interaction is constructed. More specifically, a weighted sum of the harmonic force components in the time domain is used to reconstruct the time-resolved waveform of the tip-sample forces. The weighted sum of the harmonic force components is calculated by multiplying each harmonic amplitude by a factor before summation where the factor is the frequency response of the cantilever. A weighted sum is used because the same force amplitude at two different frequencies result in different vibration amplitudes. The difference in vibration amplitudes is taken into consideration by the use of the weighted sum. The torsional cantilever of the present invention enables the generation of torsional harmonics with enhanced amplitude so that measurement of the harmonics can be readily made. Thus, the torsional cantilever of the present invention enables the measurement of the force/distance relations of the tip-sample interaction.

According to another aspect of the present invention, a torsional cantilever has a torsional resonance frequency that matches an integer multiple of the fundamental flexural resonance frequency of the cantilever when the cantilever is driven at a driving frequency. Such a torsional cantilever, referred herein as a "torsional harmonic cantilever", has one of its harmonics coincided with the torsional resonance of the cantilever. In this manner, the torsional motion of the torsional harmonic cantilever at that harmonic frequency will be largely enhanced by the corresponding torsional resonance. The ratio of the torsional resonance frequency to the fundamental flexural resonance frequency of the torsional harmonic cantilever can be tuned by selecting appropriate cantilever geometry since the geometry of the cantilever determines the resonance frequencies of the cantilever. The torsional harmonic cantilever of the present invention can provide improvement in imaging by using the higher order harmonics as the imaging signals. While the tuned resonance frequency will have a high signal to noise ratio, all other harmonics of the cantilever vibration will still have good signal to noise ratio due to the torsional motion.

Figure 11:
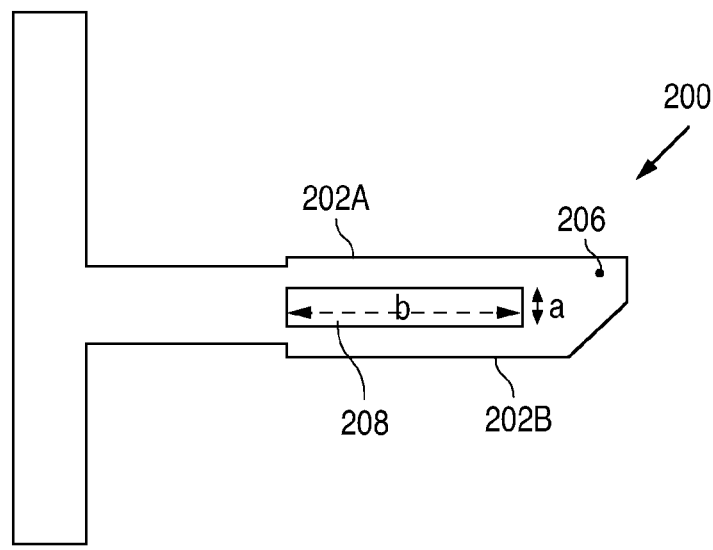
FIG. 11 is a top view of a torsional harmonic cantilever according to one embodiment of the present invention.

FIG. 11 is a top view of a torsional harmonic cantilever according to one embodiment of the present invention. Referring to FIG. 11, a torsional harmonic cantilever 200 includes a cantilever arm formed by a first arm portion 202A and a second arm portion 202B. The first and second arm portions are separated by an opening 208. A probe tip 206 is located at the free end of the cantilever arm and is positioned at an offset displacement from the axis of torsion of the cantilever. Cantilever 200 includes a free end that has an asymmetrical shape where one side of the free end is tapered. By incorporating two separated arm portions in cantilever 200, each arm portion can bend more easily so that torsional resonance frequencies are lowered. One has to choose proper dimensions for the arms to tune the ratio of the torsional resonance frequency and fundamental flexural resonance frequency to an integer.

By using an offset tip placement, torsional harmonic cantilever 200 can enhance torsional motion to enable detection of high frequency force components of the tip-sample interaction. In one implementation, cantilever 200 is able to realize a fundamental torsional resonance frequency that is 9 times the fundamental flexural resonance frequency.

Figure 12:
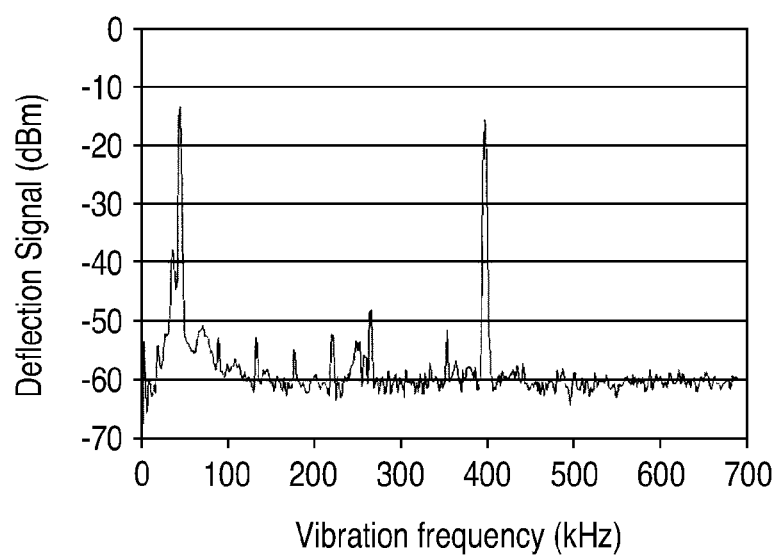
FIG. 12 is the torsional vibration spectrum of the torsional harmonic cantilever of FIG. 11 while the cantilever is being tapped on a surface at the fundamental resonance frequency.

In cantilever 200, the tuning of the torsional resonance frequency to match an integer multiple of the fundamental flexural resonance frequency of the cantilever can be carried out by varying the width of arm portions 202A and 202B or by varying the size of opening 208. The shape of the free end can also be configured to tune the resonance frequency. FIG. 12 is the torsional vibration spectrum of torsional harmonic cantilever 200 while the cantilever is being tapped on a surface at the fUndamental resonance frequency. Referring to FIG. 12, the first peak in the vibration spectrum is at the fundamental resonance frequency and the peak at 400 kHz is the torsional resonance frequency. The torsional resonance frequency at 400 kHz is at the $9^{th}$ harmonic of the fundamental resonance frequency and the signal to noise is more than 40 dB. The vibration spectrum of FIG. 12 illustrates how torsional harmonic cantilever 200 can be tuned to have a fundamental torsional resonance frequency that is 9 times the fundamental flexural resonance frequency.

Figure 13:
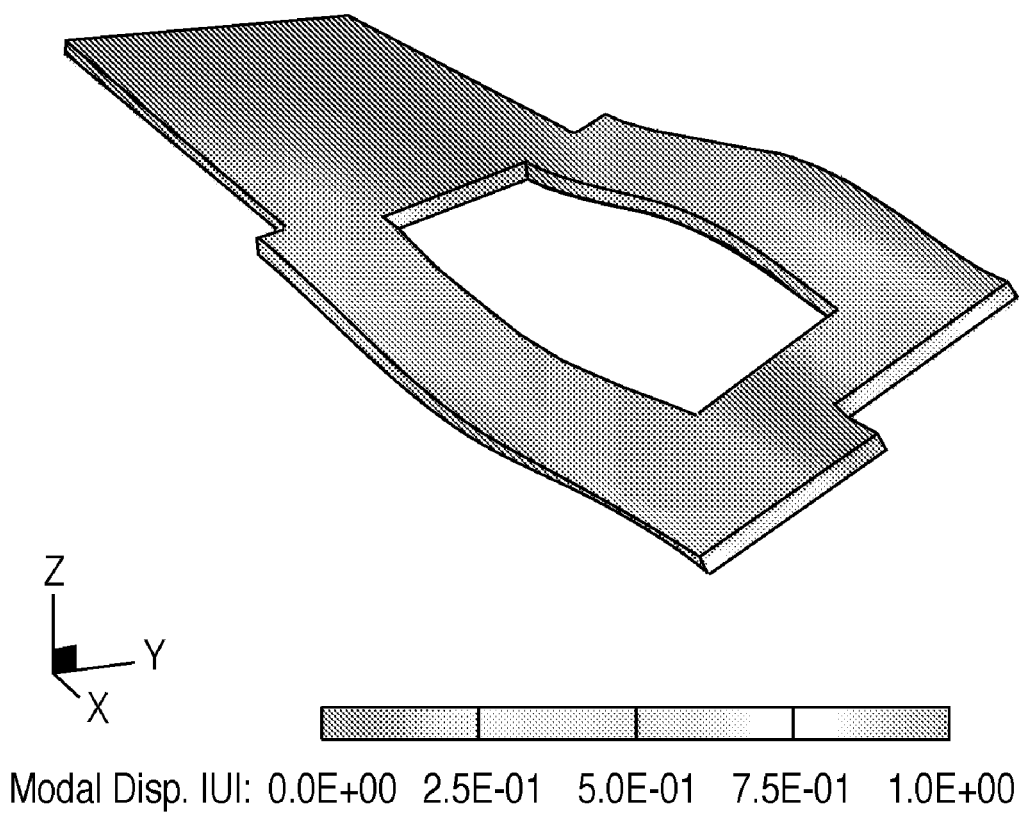
FIG. 13 illustrates the mode shape of the torsional vibration of the torsional harmonic cantilever of FIG. 11.

FIG. 13 illustrates the mode shape of the torsional vibration of the torsional harmonic cantilever of FIG. 11. The mode shape confirms that by placing the probe tip near the edge of the cantilever arm, the tip will experience large displacement in torsional modes, providing enhanced torsional signals.

Torsional cantilever 120 of FIG. 5 represents another configuration for a torsional harmonic cantilever. The torsional cantilever of FIG. 5 illustrates how the fundamental resonance frequency can be altered to tune the ratio of the torsional resonance frequency to the fundamental resonance frequency. Returning to FIG. 5, the free end of cantilever 120 is made wider than the rest of the cantilever arm. Because the free end is a highly displaced part of the fundamental resonance frequency, by making the free end wider, mass is added to the fundamental resonance frequency which has the effect of lowering the resonance frequency of the fundamental. The mass addition does not change the torsional resonance frequency appreciably but the fundamental frequency is lowered so that the ratio of the two is tuned.

In the above description, the use of the term "torsional harmonic cantilever" is not intended to limit the vibrational modes of the cantilever of the present invention to torsional motion only. As described above, the "torsional harmonic cantilever" of the present invention may, when driven at a given frequency, vibrate in a flexural mode, a torsional mode or other vibrational modes.

Furthermore, in the torsional harmonic cantilever of the present invention, the torsional resonance frequency and the fundamental flexural resonance frequency have an integer ratio or a ratio slightly below or slightly above an integer ratio, such as within 2% of the integer ratio. Thus, the integer ratio includes whole numbers and fractional numbers slightly greater than or less than the nearest whole numbers so that when the cantilever is driven at a driving frequency at or slightly below or slightly above the fundamental resonance frequency, the torsional resonance frequency is an integer multiple of the driving frequency.

The tuning of the ratio of the torsional resonance frequency to the fundamental flexural resonance frequency of the torsional harmonic cantilever to an integer value or near integer value can be accomplished in primarily two ways. First, the tuning can be accomplished by tuning the fundamental flexural resonance frequency to be an integer divisible of the resonance frequency of the selected torsional resonance frequency. Second, the tuning can be accomplished by tuning the resonance frequency of the selected torsional mode to be an integer multiple of the fundamental flexural resonance frequency. Alternately, both tuning methods can be applied at the same time to tune the ratio to the selected torsional resonance frequency to be an integer multiple of the fundamental flexural resonance frequency.

Tuning the fundamental frequency of the torsional harmonic cantilever to be an integer divisible of the resonance frequency of the selected torsional resonance frequency can be accomplished by incorporating geometric features in the cantilever that have dominant effects on changing the fundamental flexural resonance frequency as compared to the resonance frequency of the torsional modes. For instance, increasing or decreasing the length of the cantilever by adding or removing mass to the free end of the cantilever will correspondingly increase or decrease the frequency ratio.

Alternately, when the cantilever has a rectangular shape or close to a rectangular shape with or without a tapered end, the length to width ratio of the cantilever arm can be adjusted to alter the fundamental flexural resonance frequency. The higher the length to width ratio, the higher the ratio of the torsional to fundamental frequencies. Selecting correct values of length and width will tune the frequency ratio to an integer value or near integer value.

The fundamental resonance frequency can also be tuned by increasing or decreasing the effective width or thickness at a highly displaced region of the fundamental mode, which has the effect of decreasing or increasing the fundamental resonance frequency. Typically, this mass modification is applied towards the free end of the cantilever. By decreasing or increasing the fundamental resonance frequency, the ratio of the torsional to fundamental frequencies will correspondingly increase or decrease.

Finally, the frequency ratio can also be tuned by increasing or decreasing the effective width or thickness at a high mechanical stress region that has the effect of decreasing or increasing the resonance frequency ratio. Typically, this mass modification is applied towards the base of the cantilever.

Tuning the resonance frequency of the selected torsional mode to be an integer multiple of the fundamental flexural resonance frequency can be accomplished by incorporating geometric features in the cantilever that have dominant effects on changing the resonance frequency of the torsional modes as compared to the fundamental flexural resonance frequency. In a cantilever, there are many torsional vibrational modes. In general, the first few (2-3) modes are of interest.

First, the resonance frequency of a torsional mode can be tuned by forming arm portions with openings in the body of the cantilever while maintaining the effective width of the cantilever without the openings. One exemplary embodiment of such a torsional harmonic cantilever is shown in FIG. 11. Referring to FIG. 11, the arm portions and the openings can be characterized by the location of the opening(s) along the body of the cantilever, the separation ("a") of the arms and the extension ("b") of the opening(s).

Proper tuning can be achieved by adjusting the location and the extension of the opening and the separation of the arms, such as by use of a simulation tool to find the optimum values of the separation and extension lengths. In general, providing arm portions with openings in the body of the cantilever will lower the ratio of the resonance frequencies. The amount that the ratio is lowered is proportional to the extension of the opening.

Alternately, increasing the separation ("a") of the arms will reduce the frequency ratio if the arms are located at a high angular displacement region in that particular torsional mode. Also, the width of the individual arms can also be increased to tune the resonance frequency of the torsional mode, mainly by leading to an increase in the effective width of the cantilever.

In FIG. 11, torsional harmonic cantilever has two arm portions in parallel. This geometric configuration is illustrative only and is not intended to be limiting. A torsional harmonic cantilever of the present invention can be provided with multiple arm portions. Furthermore, the arm portions do not have to be parallel, that is, the arm portions can be anti-parallel. For instance, FIG. 10 illustrates a V-shaped torsional harmonic cantilever including two arm portions.

The above detailed descriptions are provided to illustrate specific embodiments of the present invention and are not intended to be limiting. Numerous modifications and variations within the scope of the present invention are possible. The present invention is defined by the appended claims.

We claim:

1. A method for measuring high frequency force of interaction between a tip of a cantilever and a sample, comprising:

providing a cantilever having a cantilever arm and a probe tip wherein the probe tip is offset laterally from a longitudinal axis of torsion of the cantilever arm;

oscillating the cantilever in a flexural mode to cause the probe tip to repeatedly interact with the sample such that the tip-sample interaction of the laterally offset probe tip excites torsional motion of the cantilever; and detecting torsional motion of the cantilever in response to the tip-sample interaction.

2. The method of claim 1, wherein the oscillating step comprises oscillating the cantilever in a flexural mode at a driving frequency and further comprising, based on the detecting step, measuring at least one of amplitude and phase of torsional motion at a harmonic of the driving frequency.

3. The method of claim 2, wherein the driving frequency is at or near a flexural mode resonance of the cantilever.

4. The method of claim 2, further comprising, based on the detecting step, measuring at least one of amplitude and phase of a harmonic of the frequency of flexural oscillation of the cantilever.

5. The method of claim 2, further comprising mapping variations in chemical composition of the sample based on the measuring step.

6. The method of claim 2, further comprising mapping material properties of the sample based on the measuring step.

7. The method of claim 1 further comprising mapping material properties of the sample based on the detection step.

8. The method of claim 1, wherein the cantilever's fundamental torsional resonant frequency is at least 9 times the cantilever's fundamental flexural resonant frequency.

9. The method of claim 1, wherein the providing a cantilever step comprises providing a cantilever having a cantilever arm and a single probe tip wherein the single probe tip is offset laterally from a longitudinal axis of torsion of the cantilever arm.

10. The method of claim 1, wherein the providing a cantilever step further comprises providing a cantilever having a cantilever arm in which the longitudinal axis of torsion is a longitudinal center line of the cantilever arm.

11. The method of claim 1, wherein the providing a cantilever step further comprises providing a cantilever having a cantilever arm in which the longitudinal axis of torsion extends in a straight line.

12. The method of claim 1, wherein the oscillating step comprises oscillating the cantilever in a flexural mode at a driving frequency and further comprising, measuring torsional vibration harmonics of the torsional motion of the cantilever as the cantilever is deflected in response to features on the surface of the sample.

13. The method of claim 12, further comprising reconstructing a time-resolved waveform of the tip-sample interaction using the measured torsional vibration harmonics.

14. The method of claim 12, wherein the reconstructing step comprises summing the measured torsional vibration harmonics in the time domain using a weighted sum to reconstruct the time-resolved waveform of the tip sample interaction.

15. The method of claim 1, further comprising reconstructing a time-resloved waveform of the tip-sample interaction using the detected torsional motion.

16. The method of claim 1, further comprising mapping variations in chemical composition of the sample based on the detection step.

17. The method of claim 1, wherein the probe tip is offset laterally from the longitudinal axis of torsion of the cantilever arm by at least 2 microns.

18. The method of claim 1, wherein the oscillating step comprises actively driving the cantilever solely in flexural motion.

19. The method of claim 1, wherein the oscillating step comprises oscillating the cantilever in a flexural mode at a driving frequency at or near a flexural mode resonance of the cantilever.

* * * * *

UNITED STATES PATENT AND TRADEMARK OFFICE
CERTIFICATE OF CORRECTION

| | | |
|---|---|---|
| PATENT NO. | : 7,302,833 B2 | Page 1 of 1 |
| APPLICATION NO. | : 11/456810 | |
| DATED | : December 4, 2007 | |
| INVENTOR(S) | : Ozgur Sahin, Calvin F. Quate and Olav Solgaard | |

It is certified that error appears in the above-identified patent and that said Letters Patent is hereby corrected as shown below:

Column 12, line 5: Cancel "time-resloved" and substitute --time-resolved--.

Signed and Sealed this

Sixteenth Day of December, 2008

JON W. DUDAS
*Director of the United States Patent and Trademark Office*